Figures 7A, 8:
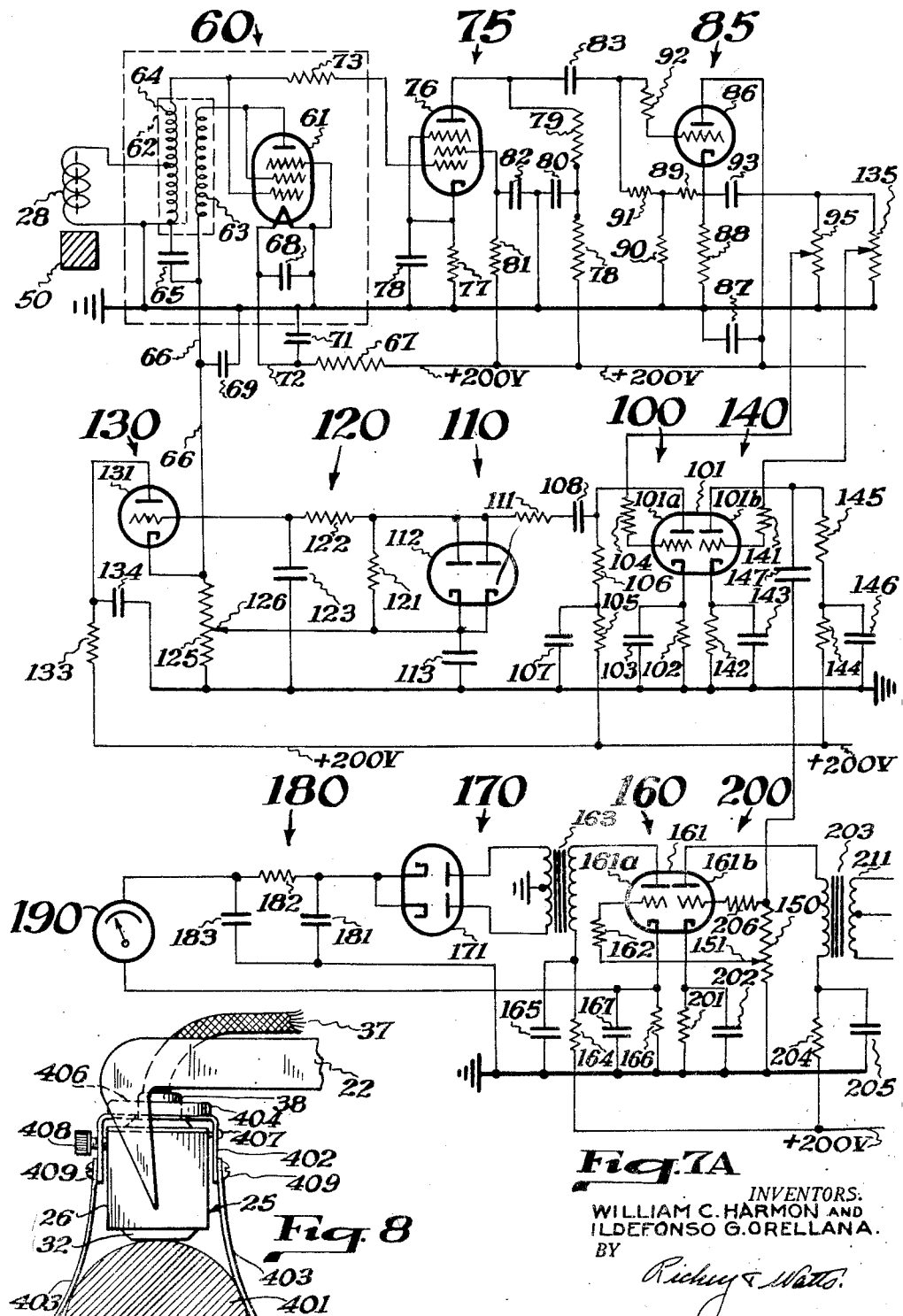

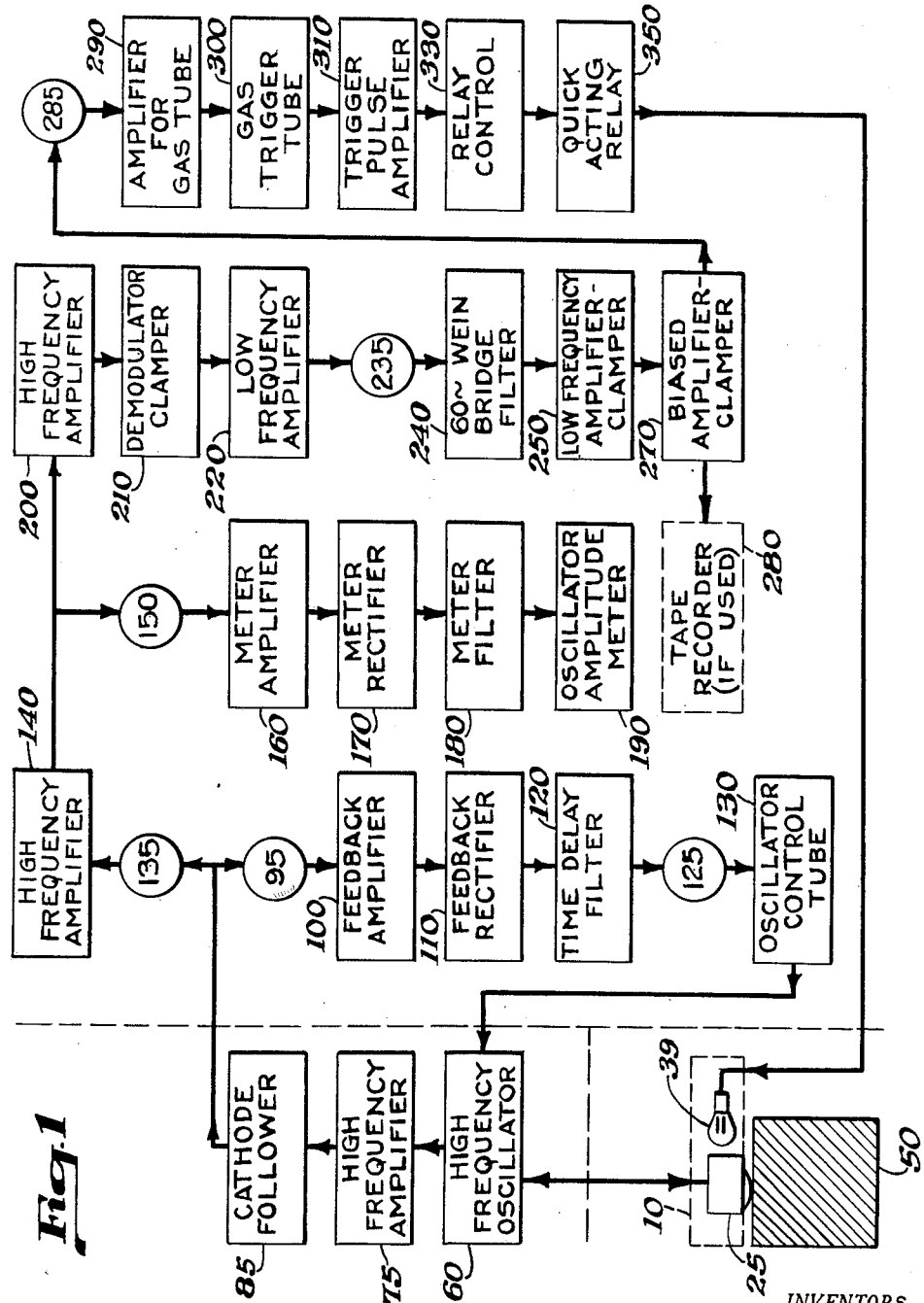

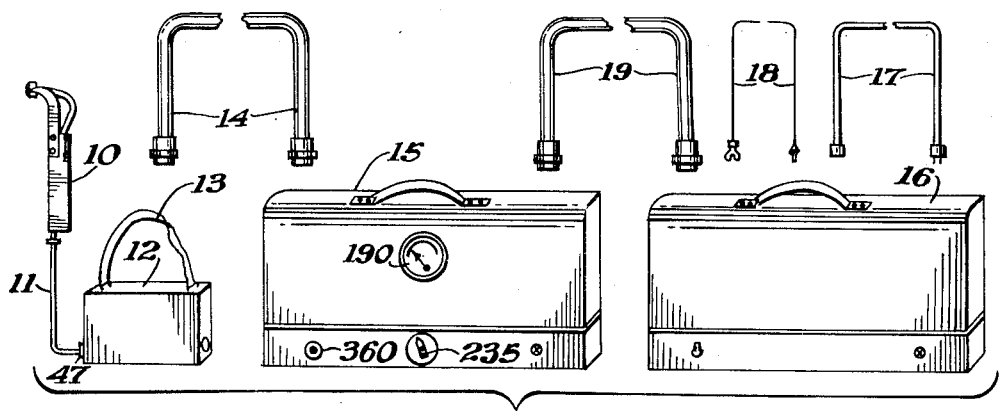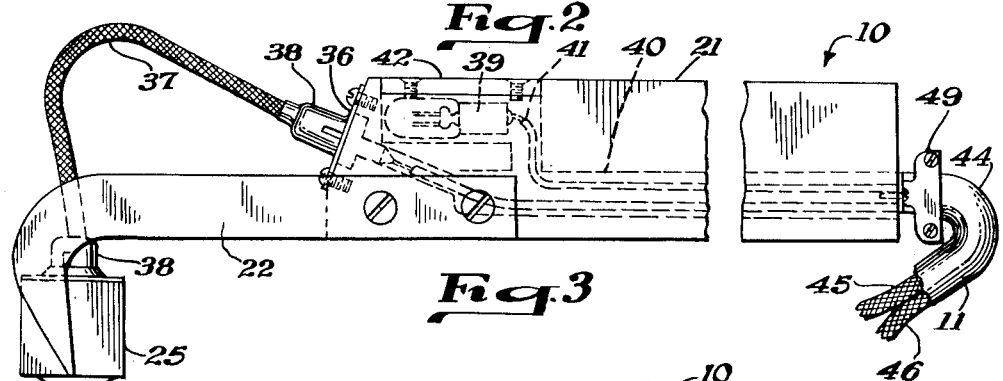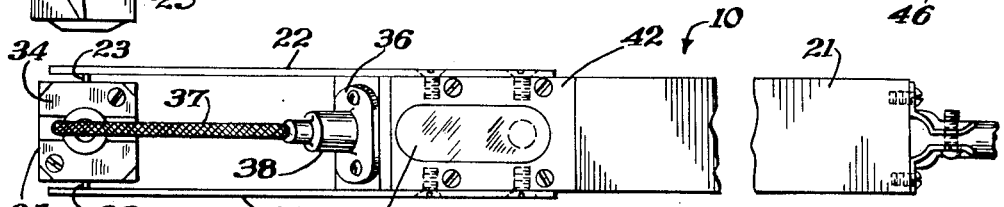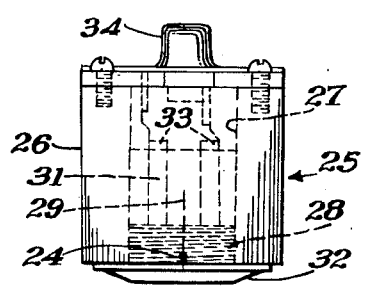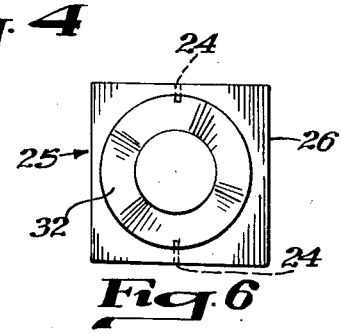

INVENTORS.
WILLIAM C. HARMON AND
ILDEFONSO G. ORELLANA.
BY
Richey & Watts
ATTORNEYS.

Patented Nov. 24, 1953

2,660,704

UNITED STATES PATENT OFFICE 2,660,704

SEAM DEPTH INDICATOR

William C. Harmon, Cleveland, and Ildefonso G. Orellana, Mayfield Heights, Ohio, assignors to Republic Steel Corporation, Cleveland, Ohio, a corporation of New Jersey Application December 14, 1949, Serial No. 132,974

22 Claims. (Cl. 324—34)

Our invention relates to the detection of flaws in metal articles. The invention is particularly suited to the detection of superficial flaws in billets or metal shapes; such flaws as seams, cracks, laps or slivers. The surface characteristics of steel billets, for example, are such that the detection of defects is difficult. Superficial cracks may be almost, if not entirely, invisible to the naked eye. Moreover, the surface appearance of a defect often affords no indication of the depth and, therefore, the significance of the defect.

Our invention is embodied in a detecting device for flaws which may be regulated to indicate flaws above a predetermined depth and thereby call attention only to those defects which are of sufficient magnitude to be noteworthy.

The preferred embodiment of the invention in apparatus for testing for seams and other flaws possesses many advantages and involves many novel features. The instrument in which the invention is embodied is both exceptionally sensitive and quite stable. The instrument is portable, and the search unit which engages the material being tested is of such nature as to maintain the proper spatial relation to the work. The search unit includes an indicator which is immediately energized when a flaw is encountered, so that the operator is immediately informed of the presence and location of the flaw. The instrument can be adjusted for various minimum depths of flaws to which it will respond, and will retain this calibration accurately. Only a small portion of the apparatus need be at the point where the examination is being conducted and this part may be connected to the less readily portable portion of the apparatus by a relatively long conductor. Thus, the instrument may be conveniently used either over a substantial area or in cramped quarters. The instrument requires no tuning or calibration after initial adjustment except the setting for seam depth, which may be rapidly and easily accomplished by the use of a test sample containing seams or cuts of known depth.

The primary object of the invention is to improve the detection of flaws in metal articles and more specifically to increase the accuracy, reliability, and convenience of such detection. Subsidiary objects of the invention relate to the provision of desirable operating characteristics, as outlined in the foregoing summary of the advantages of the invention. Many other objects and advantages of the invention contributing to the realization of the primary object thereof will be apparent to those skilled in the art from the detailed description herein of the preferred embodiment of the invention.

Figure 7B:
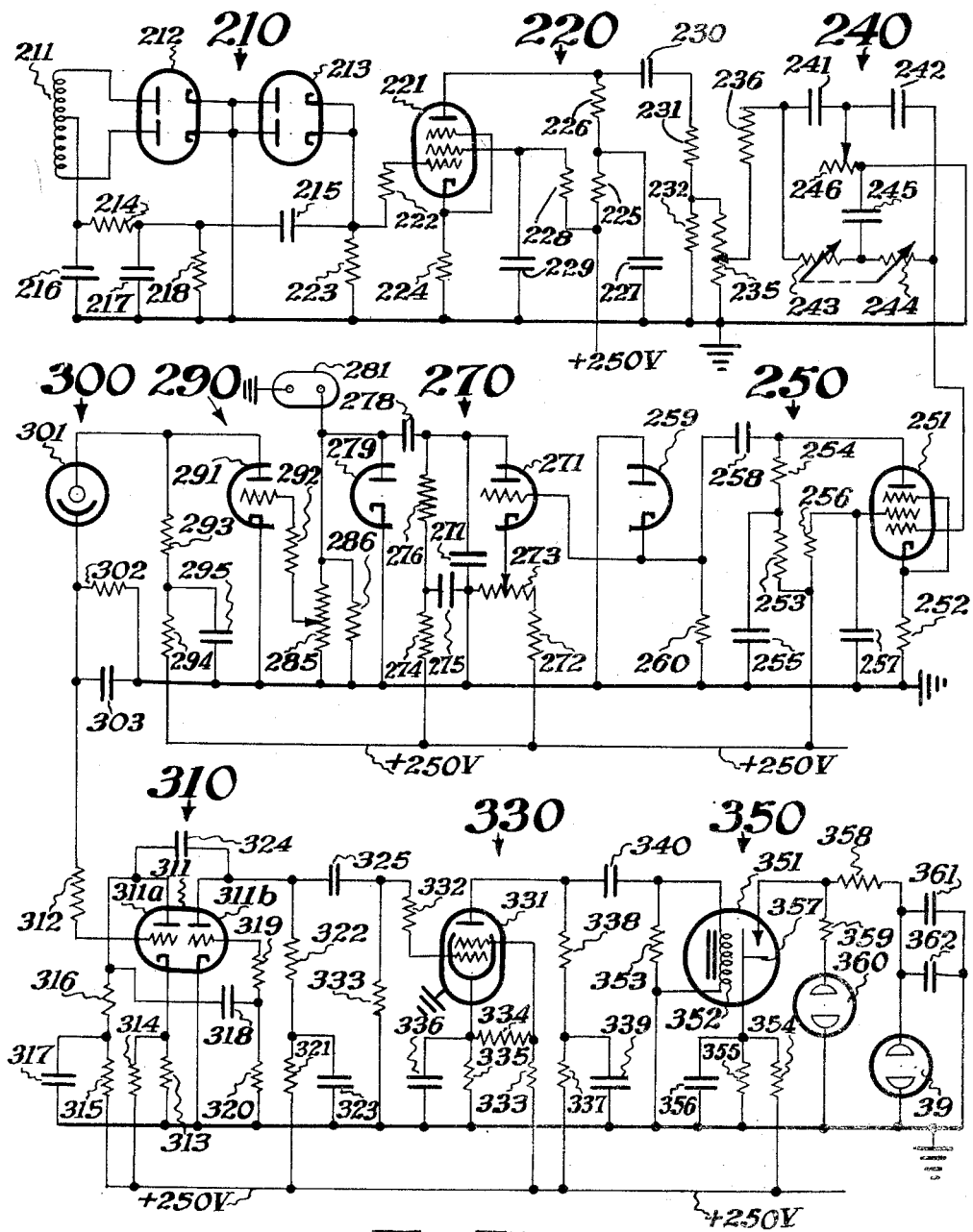

Referring to the drawings, Fig. 1 is a block diagram of the electrical system of the invention; Fig. 2 is a perspective view illustrating the preferred physical arrangement of the system; Fig. 3 is a side elevation of the hand search unit; Fig. 4 is a plan view of the same; Fig. 5 is an enlarged side elevation of the search coil; Fig. 6 is a bottom view of the same; Figs. 7A and 7B constitute a circuit diagram of the invention; and Fig. 8 is a view of a device for testing rounds.

By way of introduction to the detailed description of the preferred embodiment of the invention, the operation thereof may be briefly described. It involves moving a search coil closely over the material being tested. This coil is energized by an oscillating vacuum tube and generates currents in the steel or other metal being tested. When a flaw in the metal is encountered, the loading of the search coil is decreased, and, therefore, the output of the oscillator increases. This variation in oscillator output ultimately controls a signal light mounted in the search unit, which flashes whenever a defect is encountered of magnitude equal to or greater than that for which the instrument is set. The electrical system by which this result is obtained involves many features contributing in securing accurate and consistent operation of the device.

In the preferred physical embodiment of the apparatus, illustrated in Fig. 2, the hand search unit 10 is connected by a short shielded flexible cable 11 to a portable remote unit 12, with a shoulder strap 13, which contains the oscillator to energize the search coil and additional circuits by which the variations in oscillator output are amplified and the output impedance of the unit is lowered so that the remote unit may be at a considerable distance from the major part of the electrical system. The unit 12 is connected by a multi-conductor shielded cable 14, which may be at least a hundred feet in length, to a main electronic chassis 15. The chassis 15 contains the greater part of the electronic circuits apart from the power supply, which is housed in a power supply chassis 16. The power supply chassis 16 is energized from the usual alternating current supply through a cable 17 and is also provided with a flexible ground lead 18 by which the power supply chassis is grounded when in use. The main electronic chassis is energized through a power cable 19 from the power supply.

The hand search unit 10 (Figs. 3 and 4) comprises a Bakelite handle 21 to one end of which are secured parallel brass strips 22, the outer ends of which are directed downwardly.

A search coil assembly 25, shown enlarged in Figs. 5 and 6, is pivotally mounted between the strips 22, each of which terminates in a pin 23 (Fig. 4) extending into a socket 24 in the lower side wall of the search coil assembly. The search coil assembly (Figs. 5 and 6) consists of a Bakelite cube 26 with a vertical hole 27 drilled through the cube for mounting the search coil 28. The coil consists of 5,000 turns of number 46 wire wound around a transformer iron sliver 29, 0.020 inch by $3/64$ inch by $3/8$ inch. About a quarter of an inch of the length of the sliver 29 is embedded in a Bakelite cylinder 31 and the other end of the sliver is cemented to a synthetic sapphire shoe 32 about 3/4 inch in diameter and 0.040 inch thick. The parts 29, 31, and 32 provide a form for the winding of the coil 28. The assembly comprising the coil and the form are mounted in the cube with the cylinder 31 in the hole 27 and the shoe 32 resting against the bottom face of the cube, and the assembly is held together by cementing. The iron sliver 29 increases the coupling between turns of the search coil and concentrates the magnetic field. The leads to the coil 28 are brought through slots 33 in the cylinder 31 and to a single circuit receptacle 34 fastened to the top of the tube with screws. One of the leads from the coil is grounded to the body of the receptacle, and the other lead is soldered to the connector terminal of the receptacle.

The connector 34 is coupled to a similar connector 36 on the handle 21 by a single conductor shielded flexible cable 37 fitted with plugs 38 for attachment to the connectors 34 and 36. By virtue of the pivotal mounting of the search coil and the flexible connector 37, the coil may swing about the axis of the pivots 23. In use, the search coil assembly is slid across the surface of the work with the sapphire shoe resting against the surface and maintaining the coil in substantially fixed relation to the surface of the material being tested. The handle 21 is drilled to provide a passage 40 for leads by which the search coil 28 and a neon indicator light 39 are are connected to the flexible cable 11. The indicator light 39 is mounted in a cavity 41. A cover 42 provided with a transparent window 43 protects the bulb 39. The lamp 39 and coil 28 are each energized through two leads, one of which is grounded, thus leaving only one potential-carrying lead. The flexible cable 11 comprises a sheath 44 of rubber tubing containing two separate shielded conductors 45 and 46, the shields constituting the ground connections and the single conductors therein the leads to the coil and lamp. The conductors 45 and 46 and the grounded shields terminate in a three-point plug 47 (Fig. 2) by which the hand search unit is coupled to the portable unit 12. The cable 11 is preferably about 30 inches in length, and is fixed at the search unit by a clamp 49. The dimensions stated for the search coil assembly have been found satisfactory, but are to be regarded as illustrative, as they may be varied if desired.

The search coil of the hand unit is energized by and controls an oscillator in the portable remote unit 12 which, in turn, controls and is controlled by the circuit elements to be described in the main electronic chassis 15. The main electronic chassis energizes the lamp 39 through the flexible cables 14 and 11 when a defect of magnitude equal to or greater than that for which the instrument has been set in encountered.

Before proceeding to a detailed description of the electrical circuits involved reference may be made to Fig. 1, in which the search coil assembly 25 and indicator light 39 are indicated schematically as part of the search unit 10. The elements to the left of the vertical broken lines in Fig. 1 are those which are carried by the operator and those to the right of the broken line are preferably mounted in the main chassis. The search coil 25 is energized by the high-frequency oscillator 60 and varies the amplitude of the oscillations in accordance with surface conditions of the tested object 50. The oscillator output is amplified by a high-frequency amplifier 75, the output of which is fed to a cathode follower 85 to provide a low output impedance for the portable unit. The output of the cathode follower is conducted to the main electronic chassis. Thus, in essence the portable unit contains the oscillator which energizes the search coil and a voltage amplifier by which the variations in output of the oscillator are given sufficient strength for transmission to the main chassis and succeeding units are isolated from the oscillator.

The units in the main electronic chassis perform several functions. The signal from the cathode follower is fed through an adjusting potentiometer 95 to a stabilizing feedback circuit which controls the high-frequency oscillator. The stabilizing feedback circuit controls the operation of the oscillator so that it does not respond to slow variations in the coupling of the search coil such as may be due to convexities or concavities in the surface or variations in the texture of the surface. If such factors are permitted to influence the oscillations, the response to defects will not be consistent, but will vary with the nature of the surface. By virtue of the stabilizing feedback circuits these extraneous factors have substantially no effect. The stabilizing feedback circuit comprises a feedback amplifier 100, a feedback rectifier 110, and a time-delay filter 120, which successively amplify, rectify, and filter the signal from the oscillator to eliminate response to rapid changes in oscillation amplitudes. The setting of potentiometer 125 determines the initial conductance of oscillator control tube 130. The output of time delay filter 120 is also applied to control tube 130 which is connected to the oscillator so as to oppose any change in the amplitude of the oscillation. The elements just outlined constitute the circuit by which the search coil 25 is energized, and we believe it best to describe the preferred arrangement of these circuits in greater detail before proceeding to a discussion of the remainder of the system.

The arrangement of the electrical circuits of the entire system is indicated in the circuit diagram of Figs. 7A and 7B which, however, do not indicate the specific location of the elements in the various chassis. It will be noted that the circuit diagram is keyed to the block diagram by reference numerals. The oscillator, amplifier, and cathode follower which constitute the portable remote unit are illustrated in the upper third of Fig. 7A and the stabilizing feedback circuit in the middle third of the figure. The high-frequency oscillator 60 comprises a 1T4 pentode tube 61 connected to a shielded transformer or oscillator coil 62. The plate coil 63 of the transformer contains 4,000 turns and one end is connected to the plate and screen grid of the tube, which are tied together. The opposite end of coil 63 connects through lead 66 to the cathode of oscillator control tube 131. The grid winding 64 of the transformer is connected at one end to the grid of the tube and the other end, which is connected to ground, and the center tap of the grid coil are coupled to the search coil 28 through the flexible lead 11 (Fig. 1). The grid coil contains 16,000 turns in the preferred embodiment, and the grid and plate windings are electrostatically shielded from each other. With this coil, the frequency of operation of the circuit is approximately 15,000 cycles per second; however, the constants may be varied to obtain different frequencies of oscillation if desired. Windings 62 and 63 are connected by a plate circuit bypass condenser 65 and the plate coil is connected through a lead 66 to the feedback circuit, as will be described presently. The filament of the tube 61 is energized from the 200 volt plate supply through a resistor 67 and is bypassed by condenser 68. The resistor 67 is physically mounted in the main chassis and supplies the filament of tube 61 through a lead 72 which is carried through the flexible cable 14. Bypass condensers 69 and 71 are mounted in the main electronic chassis. A half-megohm resistor 73 couples the oscillator 60 to the high-frequency amplifier circuit 75 and prevents undesired interaction between the oscillator and amplifier tubes.

The action of the oscillator circuit 60 is based upon known principles of feedback between the plate and grid circuits which require no explanation. The search coil 28 supplied by the oscillator induces eddy currents in the specimen 50. Defects increase the length of the eddy current path and thus decrease the load of coil 28 and therefore the load of the tube 61. The amplitude of oscillation of tube 61 is thus increased when defects are encountered, and the deeper the seam, the greater the unloading effect and consequent increase in oscillation amplitude. These defects cause rapid changes in the loading of the oscillator as the search coil passes over them. Other less rapid variations due to surface conditions and curvatures of the surface, for example, are compensated through the feedback circuit which controls the energization of the plate of the oscillator tube 61 through the lead 66.

The first high-frequency amplifier circuit 75, a high-gain circuit, comprises a type 6AU6 pentode voltage amplifying tube 76, the grid of which is energized by the oscillator through resistor 73. The cathode and suppressor grid of tube 76 are supplied from the ground line through a cathode bias resistor 77 bypassed by condenser 78. The plate of tube 76 is energized from the 200 volt supply through a plate circuit decoupling resistor 78 and condenser 80 and load resistor 79. The screen grid of tube 76 is energized from the 200 volt supply through dropping resistor 81 and bypassed by condenser 82. The circuit 75 amplifies the output of the oscillator in a conventional manner.

Heater circuits for this tube and for other tubes in the device except tube 61 are not illustrated in the circuit diagram, since the arrangement of heater circuits is conventional and need not be explained to those skilled in the electronic art. The plus 200 volt supply is obtained from the power supply chassis 16 through the flexible cables 14 and 19. The power supply system will not be described since it may be of any suitable type known to those skilled in the art. For best performance, the power supply should embody regulators by which the voltage is held substantially constant.

The amplifier output is of high impedance and would be unsuitable for transmission to the remote main electronic chassis. The cathode follower output circuit is of low impedance and permits the output of the portable unit to be fed through the long cable 14. The cathode follower circuit comprises a triode amplifying tube 86 of the 6C4 type, the grid of which is coupled to the amplifier 75 by condenser 83 and grid current limiting resistor 92. The plate of the cathode follower tube is directly connected to the 200 volt line and is bypassed by condenser 87. The cathode is connected to ground through a 10,000 ohm load resistor 88 which is preferably located in the main electronic chassis. Grid bias is established by a voltage divider composed of resistors 89 and 90, of 30,000 and 200,000 ohms respectively, connected between the cathode and ground, the junction between these resistors being connected through a grid leak 91 and the grid current limiting resistor 92 to the grid of tube 86. The voltage divider provides the best value of grid bias for tube 86. In accordance with the well-known principle of operation of cathode follower tubes, the cathode of tube 86 follows the fluctuations of potential of the grid of the tube.

The cathode is connected by a lead to the main chassis to a condenser 93 which couples the cathode follower output to a potentiometer 95 by which the output of the cathode follower is variably coupled to the feedback amplifier 100. The feedback amplifier circuit 100 comprises one half of a 6SN7 double triode 101, the half employed in the feedback circuit being identified as 101a. The cathode of 101a is energized through a bias resistor 102 bypassed by condenser 103. The grid is energized from the potentiometer 95, which controls the amount of feedback, through a grid current limiter 104. The plate of 101a is energized through a plate circuit decoupling resistor 105 and load resistor 106, plate circuit decoupling condenser 107 being connected between the plate load and ground.

The output of amplifying circuit 100 is coupled to the feedback rectifier 110 by a coupling condenser 108 and a current limiting resistor 111. The rectifier circuit comprises a double diode 112 of the 6H6 type with the two diodes connected in parallel. The plates are connected to the current limiting resistor 111 and the cathodes to ground through 0.1 mfd. condenser 113.

The voltage across the rectifier 112 is impressed on the time-delay circuit 120. The circuit 120 is so designed that the output of circuit 120 which controls the operation of the feedback circuit is rapid enough to compensate for drift in the circuits, changes in surface texture, and other variations which occur at a relatively slow rate. The filter network comprises a 2 megohm resistance 121 connected across the tube 112 and a 2 megohm resistance 122 and 0.02 mfd. condenser 123 in series between the plates of tube 112 and ground.

The junction of resistor 122 and condenser 123 is connected to the oscillator amplitude control circuit 130, specifically to the grid of the triode 131, which may be a 6J5 tube. The cathode of tube 131 is connected to ground through a 10,000 ohm potentiometer 125 which forms a cathode resistor for the tube. The cathode of the oscillator control tube 131 is also connected through line 66 to the plate circuit of the oscillator tube 61. The plate of tube 131 is supplied through a resistor 133 and bypassed by condenser 134. The variable center tap 126 of potentiometer 125 is connected to the resistor 121 and the cathode of the rectifier 112.

We may now consider the operation of the feedback circuit. When tube 61 is oscillating, the swing of the grid voltage of tubes 61 and 76 is amplified by the first high-frequency amplifier 75, the cathode follower 85, and feedback amplifier 100, and the voltage output of the feedback amplifier is approximately proportional to the amplitude of the oscillations. First, assuming that the amplitude of oscillation is zero, the amplitude of the plate voltage swing of the feedback amplifier will likewise be zero. Under these conditions we may also assume that the oscillator control tube 131 has arrived at a steady state of operation with constant plate current and, therefore, that the voltage drop in the resistor 125 is constant. The potential of the tap 126 of potentiometer 125 is likewise fixed at a positive value less than that of the cathode of tube 131. The condensers 113 and 123 will be charged to the potential of the tap 126 and no current will be flowing in resistors 121 and 122. There would, thus, be no potential across the rectifier tube 112 and capacitor 108 would be charged to the difference between the potential of the plate of triode 101a and the grid potential of tube 131. Now, assuming that oscillations of constant amplitude originate in the tube 61, the plate of 101a will accordingly swing about its mean potential level. This alternating voltage is transmitted to the plates of the rectifier 112 through the condenser 108 and resistor 111. When the plates of the rectifier swing positive, current is conducted through the rectifier and potentiometer 125 to ground. When the rectifier plates are negative to the cathode, no current flows. Therefore, the average potential of the plates 112 becomes more negative and the potential difference across condenser 108 increases. Condenser 123 therefore partially discharges and the grid of the oscillator control tube 131 becomes more negative. At each positive swing of the plate of 101a, the condenser 108 receives an additional increment of charge, condenser 123 further discharges, and the grid potential of tube 131 is made more negative. Ultimately, under a steady condition of oscillation, the maximum positive potential of the rectifier tube plates equals the potential of point 126, and the plates swing negatively from this value, the amplitude of the swing being determined by the amplitude of oscillations of the tube 61. Thus, the greater the oscillation of the tube 61, the lower the average value of potential of the plates of the rectifier and, thus, of the grid of the control tube 131. When the grid of control tube 131 becomes more negative, the tube conducts less current, the drop through resistor 125 decreases and the energizing voltage of the plate of oscillator 61 is diminished. Thus, the circuit described tends to maintain the level of oscillation of the tube 61 at a constant value, but operates with a delayed or integrating response, since the response depends upon charging or discharging condenser 123 through a high resistance.

When there is a transient disturbance of the oscillator due to a flaw, oscillation amplitude increases before any significant compensation occurs. The increase initiates a compensating action in the control circuit 130 which is reversed after the flaw is crossed by the detector. This action of the control tube causes a transient decrease in the amplitude of oscillation after the flaw is crossed until the system again returns to normal. Thus, each flaw causes a transient increase in oscillation level immediately followed by a transient decrease.

As will be apparent, if the average level of oscillation decreases, the condenser 123 will be charged additionally, the grid of the control tube 131 will be more positive, more current will flow through this tube, and a greater plate voltage will be supplied to the oscillator. Thus, the system so far described provides a very stable self-regulating oscillating system which is sensitive in response to defects, but is self-regulating to accommodate drift in circuit constants or changes in the overall character of the surface tested. The above discussion has assumed that the tap 126 of the potentiometer 125 is fixed, which is the case in normal operation. This tap provides a direct control of the normal grid potential and thereby the conductance of tube 131. It thus serves as a convenient adjustment of the average oscillator amplitude of the system by determining the normal plate voltage of the oscillator.

The output of the cathode follower circuit 85 supplies, in addition to the feedback circuit previously described, a circuit for operating an oscillator amplitude meter and the circuit by which the indicator light 39 is actuated. Excitation for both these circuits, as indicated in Fig. 1, is taken from the cathode follower 85 through the potentiometer 135 and the second high-frequency amplifier 140 by which the signal strength is increased. The output of the amplifier 140 is divided to control the two above-mentioned circuits.

The cathode of tube 86 is connected through the coupling condenser 93 to the potentiometer 135, which is in parallel with the feedback potentiometer 95. The variable tap of potentiometer 135 is coupled to the grid of a triode amplifier 101b, which is one half of the double triode 101, through a current limiting resistor 141. The cathode of triode 101b is biased by resistor 142 bypassed by condenser 143. The plate of 101b is energized from the plus 200 volt supply through a decoupling resistor 144, decoupling condenser 146 and plate loading resistor 145. The high-frequency amplifier 140 is thus a conventional amplifying circuit; however, it is designed to provide adequate amplification abilities up to about 30 kc. The plate of the triode 101b is coupled through condenser 147 to potentiometer 150, the other end of which is grounded.

The variable tap of potentiometer 150 provides a means for adjusting the sensitivity of the oscillator amplitude meter circuit which comprises (Fig. 1) meter amplifier 160, meter rectifier 170, meter filter 180, and the oscillator amplitude meter 199. The meter circuit indicates performance of the oscillator and other circuits preceding the meter circuit. It does not indicate defects. The meter amplifier 160 may conveniently employ one half 161a of a dual triode 161. The grid of triode 161a is energized from the variable tap 151 of the potentiometer 150 through a grid current limiting resistor 162. The plate of the tube is connected through the primary of a one-to-one ratio transformer 163 and a plate circuit decoupling and voltage dropping resistor 164 to the 200 volt plate supply. A plate circuit decoupling condenser 165 is connected between the transformer and ground. The cathode of 161a is biased by resistor 166, bypassed by condenser 167. The amplifier 160 acts as a conventional amplifier and its output is coupled to the rectifier 170 by the transformer 163.

The secondary of transformer 163 is provided with a grounded center tap and is coupled to the plates of a diode rectifier 171, the cathodes of which are connected directly to the meter filter circuit 180. The filter 180 consists of a condenser 181, resistance 182, and condenser 183 in a standard arrangement to smooth the D. C. output of the rectifier. The output of the filter is connected directly to the meter 190. The other terminal of meter 190 is connected to the cathode of the amplifier tube 161a and thus to ground through the cathode bias resistor 166. The operation of the amplitude meter circuit is as follows: With no oscillations in tube 61, the grid of tube 161a is at constant potential, there is no alternating output from transformer 163 and, therefore, apart from incidental effects, no input to meter 190. However, because of slight disturbances in the several stages of amplification, and because of Edison effect in the rectifier tube 171, the meter would rest above zero if it were connected to ground. The voltage drop in the resistance 166 is just sufficient to balance out these effects and cause the meter to rest at zero with zero oscillations. Obviously, the output of the amplifier 160 and rectifier 170 is proportional to the amplitude of oscillation of tube 61, and the meter will indicate the amplitude of the oscillations. This meter is installed in the main electronic chassis so as to be visible, but it is to be understood that the meter does not indicate defects, and is not necessarily calibrated to read in specific units. The meter indicates the average amplitude of oscillation of tube 61, and thus indicates the performance of the oscillator and its amplifying, feedback and control circuits. An abnormally high or low reading of the meter indicates trouble in these circuits. The normal reading of the meter 190 may, of course, be adjusted by the potentiometer tap 151. The very slight current in the circuit of the meter 190 has no significant effect on the bias of tube 161a.

The remainder of Fig. 7A and Fig. 7B illustrate what may be termed the indicating circuit, the elements of which comprise the last two columns of Fig. 1. The purpose of this part of the system is to amplify the flaw pulses, eliminate spurious pulses, provide an adjustment for the minimum depth of flaw to which the device will respond, and provide energy for the operation of the indicator lamp 39. The nature of this circuit will be most clearly understood from the following detailed description.

The output of the second high-frequency amplifier 140 is directly coupled to the third high-frequency amplifier 200 which is the first unit of the indicating circuit, and is a conventional amplifying circuit designed to handle frequencies up to 30 kc. The plate of triode 101b is coupled to the grid of triode 161b through the condenser 147 and resistor 206. The cathode of 161b is biased by resistor 201, bypassed by condenser 202. The plate of the tube is coupled through the primary of the one-to-one ratio transformer 203 to a plate decoupling circuit comprising resistance 204 and condenser 205.

The center-tapped secondary 211 of the transformer 203 supplies the demodulator-clamper circuit 210 (Fig. 7B), which comprises a 6H6 double diode rectifier tube 212 serving as a demodulator and a similar tube 213 acting as a clamper. The demodulator 212 eliminates the high frequency oscillations, but preserves the modulating pulses resulting from cracks and other defects. The clamper diode 213 energized from the demodulator through a filter, preserves a zero reference level above which the pulses due to defects appear.

The secondary winding 211 is connected to the plates of rectifier 212 and the center tap of 211 is coupled through a capacity-resistance filter comprising resistor 214 and condensers 216 and 217 to a load resistor 218. The output of the demodulator tube 212 is coupled by condenser 215 to the cathodes of the clamper tube 213 is parallel. The anodes of tube 213 and the cathodes of tube 212 are grounded. As will be apparent, negative pulses are shorted by the tube 213, but positive pulses, which are not conducted by the tube, are passed to the succeeding circuits. The normal potential of the cathodes of tube 213 is zero, but they swing positive when a signal is received. In this way a constant potential is maintained at the input to the low frequency amplifier 220 except when a positive pulse from the detection of a flaw is received.

An increase in amplitude of the oscillations drives the center tap of winding 211 more negative and a decrease in oscillations makes it more positive. Thus, the positive pulses transmitted to the low-frequency amplifier 220 are those resulting from the decrease in oscillation amplitude, which pulses have been found to be slightly stronger and more consistent than those due to the original increase in oscillations.

The first low-frequency amplifier 220 is a conventional resistance-capacity coupled pentode circuit except that the cathode bias resistor is not bypassed by a condenser, in order to maintain the greatest possible stability, and the circuit values are chosen so that positive input pulses will be amplified to the best advantage. The low-frequency amplifier 220 comprises a 6SJ7 pentode 221, the grid of which is coupled through a limiting resistor 222 to the cathodes of the clamper 213 and is grounded through the grid leak 223. The cathode of tube 221 is biased by resistor 224, and the plate is energized from a 250 volt positive supply through decoupling resistor 225, decoupling condenser 227, and plate load resistor 226. The screen grid is energized from the 250 volt supply through a voltage dropping resistor 228 and is bypassed by condenser 229. The amplifier circuit 220 is coupled by condenser 230 to a sensitivity control attenuating circuit comprising voltage dividing resistors 231 and 232 and potentiometer 235. The potentiometer 235 adjusts the overall amplification of the low frequency amplifying circuit comprising the first low-frequency amplifier 220, the Wein bridge filter 240, the low-frequency amplifier-clamper 250, and the biased amplifier-clamper 270, and thus determines the threshold of response of the indicator. This potentiometer is mounted in the chassis 15 for convenient adjustment of the threshold.

The output of the low-frequency amplifier 220 is fed through potentiometer 235 and isolating resistor 236 to a modified Wein bridge rejection filter 240 which is employed to eliminate any 60-cycle voltage which may have gotten into the amplifying circuits. The bridge comprises 0.01 mfd. condensers 241 and 242 in adjacent legs of the bridge and variable half-megohm resistors 243 and 244, which are adjustable in unison, in the other leg of the bridge. The diagonal of the bridge consists of a 0.02 mfd. condenser 245 and a 250,000 ohm variable resistor 246, the center point between the elements 245 and 246 being grounded. The output of the Wein bridge is taken from the opposite corner from the input and is directly coupled to the low-frequency amplifier-clamper circuit 250.

This circuit comprises first a low-frequency amplifier which is a conventional circuit except that, to maintain the greatest possible stability, the cathode bias resistor is not bypassed with a condenser, and the circuit component values are so chosen that negative input pulses are amplified to best advantage. This amplifier comprises a 6SJ7 pentode amplifier tube 251, the grid of which, as stated, is energized directly from the output of the Wein bridge. The cathode of the tube is connected to ground through the bias resistor 252. The plate is energized from the plus 250 volt supply through the decoupling resistor 253, load resistance 254, and decoupling condenser 255. The screen grid is energized through a voltage-dropping resistor 256 and is bypassed by condenser 257. As will be seen, the circuit is similar to that of the first low-frequency amplifier 220. The negative pulses on the grid of the amplifier 251 create positive pulses in the output, which are transmitted by a coupling condenser 258 to the cathode of a clamper diode 259, half of a 6H6 tube. A half-megohm resistor 260 is coupled between the cathode of diode 259 and ground and serves as a leak for the condenser 258, maintaining the cathode of 259 normally at zero potential. Since the plate of 259 is grounded, the positive output pulses of tube 251 are transmitted, but any negative voltage is short-circuited. Short positive pulses in the output of the amplifier 250 are transmitted to the grid of the amplifier tube 271 since condenser 258 has not sufficient time to discharge appreciably through the grid leak during these pulses.

The biased amplifier-clamper 270 includes the triode 271, which amplifies only positive input pulses which exceed a given level, and thus acts to nullify or block minor irregularities from the succeeding circuits. The sensitivity level of the tube 271 or, in other words, the minimum pulse to which it will respond, is controlled by varying the cathode bias. The cathode bias of tube 271 is derived from a voltage divider circuit between the plus 250 volt supply and ground comprising a resistor 272 and potentiometer 273, the tap of which is connected to the cathode. By varying the position of the tap, the bias of the cathode of 271 can be adjusted to any desired value from zero to about 20 volts, so that the tube 271 is cut off at zero grid bias and at all levels of signal up to the level which it is desired to transmit. The plate of triode 271 is energized through the plate circuit decoupling resistor 274 and condenser 275 and plate load resistor 276. The plate circuit is loaded by a 0.1 mfd. condenser 277, one side of which is grounded. The output of biased amplifier 271 is fed through coupling condenser 278 to the plate of a diode clamper 279, the cathode of which is grounded. Since the tube 279 does not conduct the negative output pulses of tube 271, it passes these to the output of the biased amplifier-clamper circuit. As illustrated in Fig. 1, this output may be coupled to a tape recorder 280 which is not illustrated in detail, since it may be a commercial oscillograph. The elimination, by the circuits described, of minor pulses and incidental irregularities in the supply to the oscillograph promotes a clean record of surface defects. As illustrated in Fig. 7B, the output of the biased amplifier-clamper may be fed to one terminal of a connector 281 by which an oscillograph may be coupled to the system, the other terminal of 281 being grounded.

The remainder of the system by which the indicator light 39 is actuated may be regarded as a trigger circuit for the light. This trigger circuit is comprised of the items in the last column of Fig. 1, the first element of the trigger circuit being a potentiometer 285 by which the sensitivity of the trigger circuit is regulated. The output of the biased amplifier-clamper 270 is connected through the half-megohm potentiometer 285 to ground, the potentiometer being shunted by half-megohm resistor 286 to reduce the impedance of the output circuit.

The variable tap of potentiometer 285 is connected to the grid of triode 291 of the amplifier circuit 290 through a grid current limiting resistor 292. The cathode of the tube is connected directly to ground and the plate is energized from the 250 volt positive supply by plate load resistance 293, decoupling resistance 294, and decoupling condenser 295.

Diodes 259 and 279 may be in the same envelope, and similarly with triodes 271 and 291.

The plate of the amplifier tube 291 is connected to the anode of a gas trigger tube 301 of the trigger tube circuit 300. Tube 301, of the VR75 type, is connected to ground through resistor 302 and condenser 303 in parallel. Tube 291 is normally conducting and the potential at the plate of 291 is approximately 25 volts, which is insufficient to trigger gas tube 301. However, the pulses on the grid of 291 are negative and reduce the conductivity of the tube so that the plate voltage increases. Pulses above the desired level for which the circuit is adjusted fire the gas tube 301, thus charging the condenser 303 which is preferably 0.5 mfd. As soon as the pulse terminates, the potential of the plate of 291 decreases so that the trigger tube is extinguished and ceases to conduct. The setting of the slider on potentiometer 285 determines the pulse level at which the circuit triggers. Resistor 302 is preferably 4,000 ohms. The condenser 303 and resistor 302 act to lengthen the pulse so that the output of the gas trigger tube will be of sufficient duration to produce a square wave pulse of sufficient duration in the output of the trigger pulse amplifier 310 to operate relay 351. The trigger pulse amplifying circuit 310 is provided primarily to eliminate spurious indications by providing a strong pulse of approximately constant strength for each firing of the gas tube 301. The output pulses from the trigger pulse amplifier 310 drive the relay control circuit 330, which, in turn, operates the quick acting relay 351.

The trigger pulse amplifying circuit 310 consists of two stages of amplification employing a dual triode high mu 6SL7 tube 311. The grid of the triode 311a which performs the first stage of the amplification is energized from the gas trigger tube through a grid current limiting input resistor 312. The cathode of this triode is biased by a voltage divider comprising resistors 313 and 314 connected between the plus 250 volt line and ground, resistor 313 being of 5,000 ohms and resistor 314 a cathode bias bleeder of one-half megohm. This divider supplies a larger than normal cathode bias to triode 311a so that 311a amplifies only that portion of each trigger pulse which exceeds a given level, thus maintaining the duration of the square wave output pulse at the desired value and leaving the tube insensitive to circuit disturbances. The plate 311a is energized through the decoupling resistor 315, plate load resistor 316, and decoupling condenser 317. The plate of 311a is coupled to the grid of 311b through a 0.1 mfd. condenser 318 and a grid current limiting resistor 319. Triode 311b is provided with a grid leak 320. The plate of 311b is connected in a similar manner to that of 311a by resistors 321 and 322 and condenser 323. A .0003 mfd. condenser 324 is connected between the two plates of tube 311 to suppress parasitic oscillations. The cathode of triode 311b is connected directly to ground. The positive input pulses when fed through the two stages of the trigger pulse amplifier 310 give rise to positive output pulses which are of substantially equal amplitude, since the amplification of the two stages is great enough to produce a high degree of limiting on all pulses which appear across condenser 303. The output of amplifier 310 is therefore a substantially square wave pulse, the pulses being substantially identical in amplitude.

Amplifier circuit 310 is coupled by condenser 325 to the relay control tube circuit 330, the condenser 325 being connected to the grid of the type 6V6 pentode amplifying tube 331 through a current limiting resistor 332, a grid leak 333 being provided in the grid circuit. The relay control tube is normally nonconducting and is driven to maximum conductance by the pulses from the trigger pulse amplifier for a definite time. Since these pulses are substantially square, tube 331 acts like a switch which is quickly snapped on and then off. Resulting changes in the potential of the plate of tube 331 are applied to the quick acting relay 351, producing extremely rapid and reliable operation of the relay. The cathode and screen grid of tube 331 are energized through a voltage divider comprising resistors 333, 334, and 335 connected between the positive supply and ground to provide correct voltages for the cathode and screen grid. The cathode resistor is bypassed by condenser 336. The plate is supplied through decoupling resistance 337 and load resistance 338 and decoupling condenser 339.

The coil 352 of the relay 351 is energized from the power tube 331 through condenser 340, and is shunted by resistor 353. The contacts of this relay are normally open and the relay is normally deenergized. When tube 331 conducts and energizes the relay, it closes an energizing circuit for the indicator lamp 39 and for an indicator light mounted in the main chassis. The circuit by which the indicator light 39 is energized comprises a bleeder filter circuit connected to movable contact 357 of the relay, including resistor 354 connected to the positive line and resistor 355 and condenser 356 connected to ground. The fixed contact is connected through a current limiting resistor 358 to the neon indicator light 39 in the hand search unit. It is also connected through current limiting resistor 359 to a neon indicator 360 in the main electronic chassis. The lead from the relay to the hand search unit passes through cables 14 and 11, in which it is shielded. The lead to the indicator lamp is grounded at the main electronic chassis and the portable unit through bypass condensers 361 and 362, respectively.

Although the overall operation of the indicating circuit should be clear from the foregoing, it may be reviewed briefly. An increase in the amplitude of oscillation of the tube 61 due to a defect increases the alternating output of the third high-frequency amplifier 200. This output is rectified and the normal output level is held at zero in the demodulator clamper circuit 210. Positive impulses caused by defects are amplified in the low-frequency amplifier 220, the output of which is fed through depth control potentiometer 235 to the Wein bridge filter 240 tuned to eliminate 60 cycle components. The filtered signal is further amplified in the low-frequency amplifier 251, the output of which, apart from transmission of pulses, is held at zero by the clamper 259. The biased amplifier 271 rejects minor pulses and disturbances and passes the amplified defect pulses by way of a final clamper 279 to the recorder 280, if one is employed, and to the trigger circuits for the defect indicating light.

Pulses entering the trigger circuit are amplified by the amplifier 299 which controls the operation of the gas discharge tube 301, causing the tube 301 to fire at each pulse which exceeds a critical level. When the gas tube fires, it charges condenser 303, the voltage pulse attending the charge and discharge of this condenser controlling the high-gain two-stage trigger pulse amplifier 310, which, in turn, drives the relay control power tube circuit 330. The output of this circuit energizes the quick-acting relay 351 which flashes the neon indicator 39.

The several potentiometers in the system, except the potentiometer 235, serve to balance the sensitivity of the various components of the system and ordinarily need not be adjusted after the initial balancing of the system unless circuit constants are changed, as by the replacement of elements.

The adjustment of the instrument for sensitivity of indications or, in other words, the minimum depth of flaw which causes the indicator light to flash, is effected by potentiometer 235. The instrument as described can be set to indicate seams or cracks exceeding any given depth in a range of from 0.005 inch to 0.125 inch by turning the adjusting knob 235 on the main chassis. While, of course, the control knob for potentiometer 235 could be calibrated in terms of depth settings, the preferred method of calibration of the instrument employs a section of billet, which may be represented by the object 50 in Fig. 1, with .006 inch wide slots of various known depths milled in the surface of the billet. Using this calibration sample, the instrument can be quickly and easily set by moving the search coil over the crack of the minimum depth which it is desired to detect, and advancing the potentiometer slowly from its zero setting until the indicator light 39 flashes each time the search coil passes over the milled slot. The instrument will then indicate seams of depth equal to or greater than the calibrating slot.

The apparatus is then ready for use. A flat surface may be inspected by moving the search coil back and forth from edge to edge at right angles to the seams or cracks so that the search coil passes over them. The coil should be moved forward during each pass so that the entire surface is scanned. Large rounds four inches or more in diameter, may be inspected in a similar manner, rotating them after each scanning operation until the entire surface has been inspected. Rounds smaller than four inches in diameter can be inspected by using a search coil with guides to guide the coil smoothly around the circumference. Rounds may also be inspected by rotating them in front of a search coil and moving the rounds or the coil longitudinally of the axis of the round. Many other inspection procedures can be used, depending upon the material and the defects.

An arrangement to facilitate the testing of rounds is illustrated in Fig. 8. The device comprises a spring clip which may be attached to the search coil assembly to guide it along the surface of the round. As illustrated in Fig. 8, the search coil assembly 25 is mounted between the arms 22 of the handle assembly as previously described. The guiding means comprises a U-shaped sheet metal bracket 402 which may be disposed over the upper portion of the search coil assembly and clamped thereon and which is provided with depending curved spring fingers 403 adapted to engage the round 401. The horizontal portion of the bracket is formed with upstanding flanges 404 and with an opening 406 for the plug 38. A pin 407 in one arm of the bracket may fit into an opening provided in the Bakelite cube 26 and a thumb screw 408 threaded in the opposite arm of the bracket engages the opposite face of the cube 26. The spring fingers 403 are secured to the arms of the bracket by screws 409. These fingers normally tend to retain the search coil assembly in a centered relation to the round so that the center of the face of the sapphire shoe is tangent to the surface of the round. Since the fingers are flexible, they will accommodate themselves to rounds 401 of various diameters, and where an extreme range of diameter is encountered a number of centering means of different proportions may be used interchangeably. The centering means may be applied to or removed from the search unit by simply uncoupling the plug 38, fitting the guiding member in place, and tightening the screw 408.

While for many purposes the portable type of instrument specifically described herein is most suitable, it will be apparent that the principles of the system may be employed in installations where the relative movement between the object being tested and the search coil is performed automatically or otherwise by mechanism. No changes in the principle of the system need be involved in utilizing the system in a fixed setup for detecting flaws in materials fed past the search unit.

As will be apparent, the lightness and compactness of the hand search unit and portable remote unit and the very considerable area which may be covered by these units without moving the main electronic chassis render the instrument extremely convenient and suitable for many fields of use. Space is provided in the power supply chassis for storing the hand search unit, the portable remote unit, and the connecting cables, except the long cable 14. This cable may be coiled. The main electronic chassis and the power supply chassis are fitted with handles so that the entire apparatus may be readily carried by the operator from one place to another.

Although the instrument is portable, it is highly accurate and sensitive, stable in operation, and very easily calibrated. By providing the defect indicator lamp in the search unit adjacent the search coil, the operator receives an immediate indication of the defects for which the instrument is set and may mark them or take other appropriate action.

It will be apparent to those skilled in the art from the disclosure herein of the principles of the invention and the description of the preferred embodiment thereof that many modifications of structure may be made within the scope of the invention, which is not to be regarded as limited by the detailed description of the preferred embodiment.

We claim:

1. A device for detecting defects in metallic objects comprising, in combination, a search coil traversable over the surface of an object, an oscillator energizing and loaded by the coil, a control circuit responsive to the output of said oscillator including a delayed response element connected to the oscillator to oppose relatively slow variations in the output thereof, means responsive to transient variations in the oscillator output for amplifying and rectifying the oscillator output to provide pulses indicative of flaws in the object, a pulse amplifier coupled to said amplifying and rectifying means, and a flaw-indicating device operated by the pulse amplifier, and responsive to pulses above a predetermined magnitude.

2. A device for detecting defects in metallic objects comprising, in combination, a search coil traversable over the surface of an object, an oscillator energizing and loaded by the coil, a feedback control circuit responsive to the output of the oscillator and having the output circuit thereof connected to the oscillator to oppose variations in output of the oscillator, the feedback control circuit including a delayed response element so that it does not respond immediately to transient variations in oscillator output, means responsive to transient variations in the oscillator output indicative of flaws in the object, and a signal device operated by the last-named means.

3. A device for detecting defects in metallic objects comprising, in combination, a search coil traversable over the surface of an object, an oscillator energizing and loaded by the coil, a feedback control circuit responsive to the output of the oscillator and having the output circuit thereof connected to the oscillator to oppose variations in output of the oscillator, the feedback control circuit including a delayed response element so that it does not respond immediately to transient variations in oscillator output, means responsive to transient variations for amplifying and rectifying the oscillator output to provide pulses indicative of flaws in the object, a pulse amplifier coupled to said amplifying and rectifying means, and indicating means responsive to pulses above a predetermined magnitude coupled to said amplifying means.

4. A device for detecting defects in metallic objects comprising, in combination, a search coil traversable over the surface of an object, an oscillator energizing and loaded by the coil, a feedback control circuit operative to oppose variations in output of the oscillator, the feedback control circuit including a delayed response element so that it does not respond immediately to transient variations in oscillator output, means responsive to transient variations in the oscillator output for amplifying and rectifying the oscillator output to provide pulses indicative of flaws in the object, relay means sensitive to pulses above a predetermined magnitude controlled thereby, and a signal device operated by the relay means.

5. A device for detecting defects in metallic objects comprising, in combination, a search coil traversable over the surface of an object, an oscillator energizing and loaded by the coil, a feedback control circuit responsive to the output of the oscillator and having the output circuit thereof connected to the oscillator to oppose variations in amplitude of output of the oscillator, the feedback control circuit including a delayed response element so that it does not respond immediately to rapid variations in amplitude level of oscillator output, means responsive to transient variations for amplifying and rectifying the oscillator output to provide pulses indicative of flaws in the object, a pulse amplifier coupled to said amplifying and rectifying means, a trigger circuit responsive to pulses above a predetermined amplitude energized by the pulse amplifier to generate relatively uniform signals in responsive to output of the pulse amplifier, relay means controlled thereby, and a signal device operated by the relay means.

6. A device for detecting defects in metallic objects comprising, in combination, a coil traversable over the surface of the object, an oscillator coupled to the coil so that the oscillator energizes the coil and is loaded thereby, means coupled to the oscillator for amplifying and rectifying the output of the oscillator, a delayed response circuit coupled to the rectifying means, and means coupled to the delayed response circuit and the oscillator to oppose variation in oscillator output.

7. A device for detecting defects in metallic objects comprising, in combination, a coil traversable over the surface of the object, an oscillator coupled to the coil so that the oscillator energizes the coil and is loaded thereby, means for amplifying and rectifying the output of the oscillator, a delayed response circuit supplied by the rectifying means, and an oscillator control circuit controlled by the delayed response circuit and coupled to control the energization of the oscillator so as to oppose variation in oscillator output.

8. A device for detecting defects in metallic objects comprising, in combination, a coil traversable over the surface of the object, means on the coil for engaging the object and guiding the coil over the surface thereof, an oscillator coupled to the coil so that the oscillator energizes the coil and is loaded thereby, means for amplifying and rectifying the output of the oscillator, an integrating circuit supplied by the rectifying means, and an oscillator control circuit controlled by the integrating circuit and coupled to control the energization of the oscillator so as to maintain a substantially constant reference level of oscillator output.

9. A device for detecting defects in metallic objects comprising, in combination, a search coil, a visible indicator, an oscillator coupled to the search coil and loaded thereby, an amplifier boosting the oscillator output, a feedback control responsive to the oscillator output and coupled to the oscillator and including a delayed response element to stabilize the oscillator output, and a control circuit coupled to the amplifier and to the indicator to actuate the indicator in response to rapid changes in amplitude of the oscillations.

10. A device for detecting defects in metallic objects comprising, in combination, a hand search unit including a portable search coil; a portable unit comprising an oscillator coupled to the search coil and loaded thereby, and an amplifier boosting the oscillator output; a main electronic unit coupled to the portable unit by a flexible cable and comprising a feedback control adapted to stabilize the oscillator output and a circuit responsive to rapid changes in amplitude of the oscillations; and means for exhibiting the presence of defects operated by the said circuit.

11. A device for detecting defects in metallic objects comprising, in combination, a hand search unit including a search coil, a shoe to maintain the search coil at a fixed distance from the tested object, and a visible indicator; a portable unit comprising an oscillator coupled to the search coil and loaded thereby, a main electronic unit coupled to the portable unit by a flexible cable and comprising a feedback control adapted to stabilize the oscillator output and a control circuit for the indicator to actuate the indicator in response to rapid changes in amplitude of the oscillations.

12. A device for detecting defects in metallic objects comprising, in combination, a hand search unit including a search coil, a shoe to maintain the search coil at a fixed distance from the tested object, and a visible indicator; a portable unit comprising an oscillator coupled to the search coil and loaded thereby and an amplifier boosting the oscillator output; and a main electronic unit coupled to the portable unit by a flexible cable and comprising a feedback control adapted to stabilize the oscillator output and a control circuit for the indicator adapted to actuate the indicator in response to rapid changes in amplitude of the oscillations.

13. A unit for a flaw detecting apparatus comprising, in combination, a handle including a body portion and spaced strips extending from the body portion, a search coil assembly comprising non-magnetic means having a work engaging surface for maintaining the assembly in a predetermined relation to the surface of the object being tested, a sliver of magnetic material disposed so as to be maintained substantially perpendicularly to the surface of the object and with one end adjacent said surface, and a coil inductively coupled with the sliver, and pivots extending between the search coil assembly and the strips for flexibly mounting the search coil assembly on the handle and permitting the non-magnetic means to determine the relation of the assembly to the object.

14. A detector unit for a flaw detecting apparatus comprising, in combination, a handle including a body portion and spaced strips extending from the body portion, a search coil assembly comprising a shoe of hard non-magnetic material having a plane work-engaging surface and adapted to slide over a surface being tested, a sliver of magnetic material disposed so as to be maintained substantially perpendicularly to the work-engaging surface of the shoe and with one end adjacent said surface, a coil inductively coupled with the sliver, and a non-magnetic housing for the coil and sliver, and pivots extending between the housing and the strips for flexibly mounting the search coil assembly on the handle and permitting the shoe to determine the relation of the assembly to the object.

15. In a device for detecting variations in objects comprising a search coil, an oscillator coupled to the search coil, the oscillator having an output circuit and including a vacuum tube and electrodes in the vacuum tube, means supplying operating potentials to the electrodes, an amplifier coupled to the oscillator output circuit, and a feedback circuit coupled between the amplifier and at least one of the electrodes to produce a potential variation in opposition to transient changes in the output circuit of the oscillator.

16. The invention in accordance with claim 15, the said feedback circuit including a feedback amplifier coupled to the oscillator output amplifier and a control circuit coupled to the electrode and the feedback amplifier.

17. The invention in accordance with claim 15, the said feedback circuit including a feedback amplifier, a control circuit connected to at least one of the electrodes and a delay device connected between the feedback amplifier and the control circuit.

18. A device for detecting variations in objects comprising a search coil, an oscillator coupled to the search coil, the oscillator having an output circuit and including a vacuum tube and electrodes in the vacuum tube, means supplying operating potentials to the electrodes, a feedback circuit coupled between the output circuit and at least one of the electrodes to produce a potential variation in opposition to transient changes in the output circuit of the oscillator, said feed back circuit including a delay element for opposing rapid changes and rectifying means for rendering the circuit responsive only to variations in oscillator output amplitude, an indicator device and means coupled between the output circuit and the indicating device for actuating the indicator device in response to signals of greater than predetermined amplitude.

19. The invention in accordance with claim 18, the last named means comprising a trigger circuit adapted to pass only impulses of greater than predetermined amplitude.

20. The invention in accordance with claim 18, the last named means comprising a clamper and a trigger circuit coupled to the output of the clamper for amplifying impulses of greater than predetermined amplitude.

21. The invention in accordance with claim 18, the last named means comprising a clamper, an amplifier coupled to the output of the clamper, and a gaseous discharge device coupled to the output of the amplifier, the discharge device being responsive only to impulses of greater than predetermined magnitude.

22. The invention in accordance with claim 15, the said feed back circuit including a rectifier for rendering the circuit responsive only to amplitude variations of oscillator output and a delay device for opposing rapid variations in amplitude level of oscillator output.

WILLIAM C. HARMON.
ILDEFONSO G. ORELLANA.

References Cited in the file of this patent

UNITED STATES PATENTS

| Number | Name | Date |
|---|---|---|
| 1,323,824 | Breckner | Dec. 2, 1919 |
| 1,815,717 | Kranz | July 21, 1931 |
| 1,946,924 | Allen et al. | Feb. 13, 1934 |
| 2,067,804 | Thorne | Jan. 12, 1937 |
| 2,220,563 | White | Nov. 5, 1940 |
| 2,267,884 | Zuschlag | Dec. 30, 1941 |
| 2,317,720 | Barnes et al. | Apr. 27, 1943 |
| 2,326,344 | Elmendorf | Aug. 10, 1943 |
| 2,410,803 | Barnes et al. | Nov. 12, 1946 |
| 2,489,920 | Michel | Nov. 29, 1949 |
| 2,502,626 | Mages | Apr. 4, 1950 |
| 2,559,627 | Johnson | July 10, 1951 |

OTHER REFERENCES

Electronics, Jan. 1946, pages 105–109, article by Doll.

Electronics, July 1949, pages 80–83, article by Urbach.